Patented Jan. 22, 1952

2,583,448

UNITED STATES PATENT OFFICE 2,583,448

ACYLAMINOCHLORANTHRAQUINONE THIANTHRENE VAT DYESTUFFS

Paul Sutter, Binningen, and Walter Kern, Rutscheten, Switzerland, assignors to Ciba Limited, Basel, Switzerland No Drawing. Application February 25, 1949, Serial No. 78,462. In Switzerland March 5, 1948

5 Claims. (Cl. 260—327)

It is well-known in the art of dyeing that there are comparatively few vat dyestuffs producing a pure yellow shade and still fewer vat dyestuffs with a pure greenish yellow shade. The further trouble in this field is that a given shade in the range of yellow to greenish yellow can usually not be matched by mixing yellow and green or yellow and blue dyestuffs without a substantial loss of purity of shade and/or a substantial loss of fastness to light. Therefore new vat dyestuffs in the range of yellow to greenish yellow are still in great demand.

It is an object of the present invention to provide new vat dyestuffs of the kind referred to, possessing such properties as are usually required, for example, satisfactory affinity to their leuco compounds for the fiber and satisfactory fastness to light and to the usual wet treatments.

Vat dyestuffs are already known of the general formula

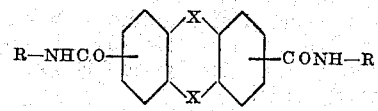

wherein each X stands for —S—, —SO— or —SO$_2$— and each R indicates an anthraquinone residue (cf., for example, Swiss Patents, 236,231; 238,628-32 and also 240,129 and 243,008).

According to the present invention, dyestuffs of particularly valuable properties are obtained when thianthrene dicarboxylic acids or partially oxidized thianthrene dicarboxylic acids, or functional derivatives of either, which compounds contain up to and including two oxygen atoms attached to sulphur, are reacted with 1-amino-6- or -7-chloranthraquinone.

The thianthrene dicarboxylic acids employed as starting materials for the present process can be obtained according to the exhaustive data of the above mentioned patents from thianthrene, for example, by way of dibromothianthrene and dicyanthianthrene. The exact positions occupied by the carboxyl groups are unknown. By oxidation there can be obtained therefrom in a simple manner products with oxygen attached to sulphur which are in part accurately definable compounds (for example, thianthrene mono-sulfoxide dicarboxylic acid) and in part are to be considered as mixtures or molecular compounds in which the number of oxygen atoms per molecule need not be a whole number, for example, it may be 1.5. Instead of pure 1-amino-6- or -7-chloranthraquinone a mixture of the two substances can also be employed in which one component can preponderate or both components are present in approximately equal proportions.

In order to carry out the reaction the dicarboxylic acids are suitably employed in the form of their reactive derivatives, for example, the acid chlorides. The reaction can, for example, be carried out in high boiling indifferent solvents such as mono-, di- or trichlorbenzene at elevated temperature, for example, at the boiling point of the solvent concerned.

The vat dyestuffs of the present invention correspond to the general formula

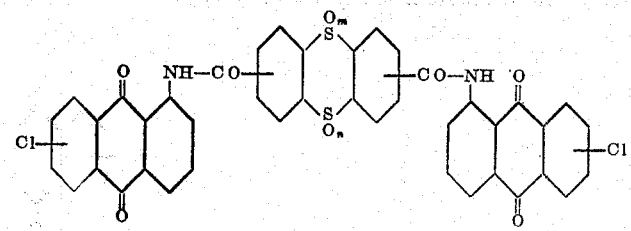

wherein the sum of $m+n$ is between 0 and 2 (inclusive) and the chlorine atoms are located in one of the positions 6 and 7. They are distinguished by generally good fastness properties and in particular by a specially favorable combination of pure, relatively greenish shades, fastness to light and dyeing capacity, whereas the corresponding known dyestuffs either exhibit a redder color shade or are inferior to the present dyestuffs in respect of fastness to light and/or dyeing capacity. The vat dyestuffs of the present invention can be employed for the dyeing and printing of the most varied materials, in particular of cellulose fibers such as cotton, linen, artificial silk and cellulose fibers from regenerated cellulose and they can also be employed as pigments.

The following examples illustrate the invention, the parts being by weight:

Example 1

3 parts of finely powdered thianthrene dicarboxylic acid and 8.5 parts of thionyl chloride are heated to 165° C. for ½ hour in 210 parts of trichlorbenzene whereupon the excess thionyl chloride is distilled off with 30 parts of trichlorbenzene. To this solution of the acid chloride are added 5 parts of 1-amino-6-chloranthraquinone and 1.6 parts of anhydrous pyridine and the whole heated to boiling for a quarter of an hour. After cooling the product is filtered with suction, washed with trichlorbenzene, then with alcohol and dried. A yellow brown powder is obtained of the formula

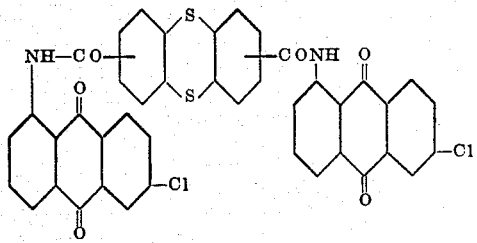

which dyes cotton from a violet vat in very fast yellow shades of particular fastness to light.

By taking instead of 1-amino-6-chloranthraquinone 1-amino-7-chloranthraquinone a similar dyestuff is obtained.

Example 2

3 parts of powdered thianthrene dicarboxylic acid are suspended in 130 parts of trichlorbenzene. After addition of 3 parts of thionyl chloride the whole is heated for half an hour to 165° C. and thereupon the excess of thionyl chloride distilled off. Then 5 parts of a mixture of approximately equal proportions of 1-amino-6-chloranthraquinone and 1-amino-7-chloranthraquinone together with 1.6 parts of anhydrous pyridine are added and the mixture heated to boiling for one hour. After cooling the product is filtered, washed with trichlorbenzene then with alcohol and dried. A yellow powder is obtained, which contains a substantial amount of the asymmetrical dyestuff of the formula

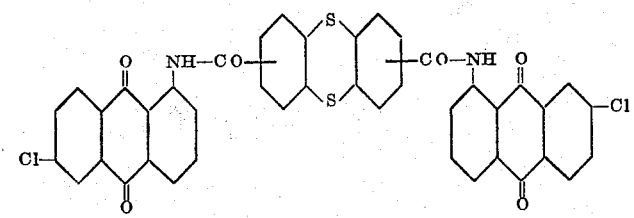

besides the two asymmetrical dyestuffs described in Example 1, and which dyes cotton from a violet brown vat in fast yellow shades.

Example 3

60.8 parts of thianthrene dicarboxylic acid are brought into solution in 20 times the quantity of water with the addition of the necessary quantity of sodium hydroxide. After addition of a quantity of sodium hypochlorite corresponding to 22.2 parts of active chlorine the solution is stirred at room temperature for 16 hours and then poured into excess of dilute hydrochloric acid. After standing for several hours the deposited product is filtered with suction, washed, dried and pulverized.

1.7 parts of the oxidized thianthrene dicarboxylic acid thus produced (which contains about 1.5 atoms of oxygen bound to the sulfur atoms) together with 2 parts of thionyl chloride and suspended in 130 parts of o-dichlorobenzene and converted into the acid chloride by heating for half an hour to 165° C. After distilling off the excess of thionyl chloride 2.6 parts of 1-amino-6-chloranthraquinone and 0.4 part of anhydrous pyridine are added and the whole heated to boiling for two hours. After cooling, the product is filtered, washed with o-dichlorobenzene, then alcohol, and dried. A yellow powder is obtained which dyes cotton from redbrown vat in fast yellow shades.

By taking instead of 1-amino-6-chloranthraquinone a mixture of 1-amino-6- and -7-chloranthraquinone a similar dyestuff is obtained.

What we claim is:

1. A member selected from the group consisting of a vat dyestuff of the general formula

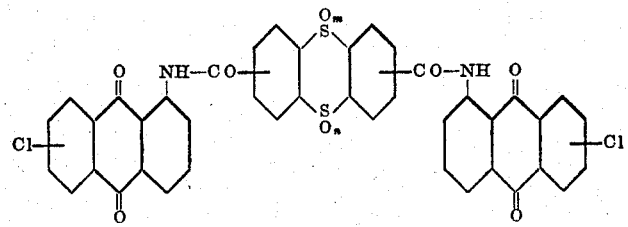

wherein the sum of $m+n$ is from 0 to 2 inclusive and the chlorine atoms are in one of the positions 6 and 7, and a mixture of different vat dyestuffs of the said formula wherein the average value of the sum of $m+n$ is 0 to 2 inclusive.

2. A vat dyestuff of the general formula

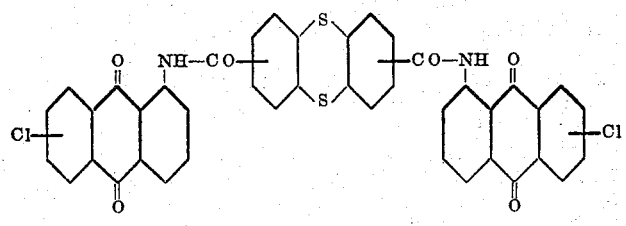

wherein the chlorine atoms are in one of the positions 6 and 7.

3. A mixture of the vat dyestuffs of the general formulae

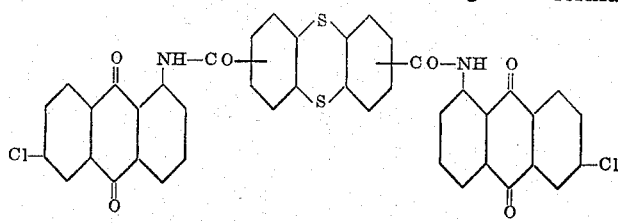

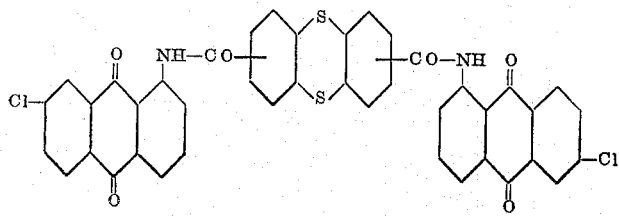

and

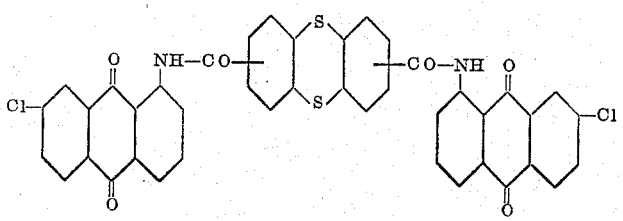

4. A vat dyestuff of the general formula

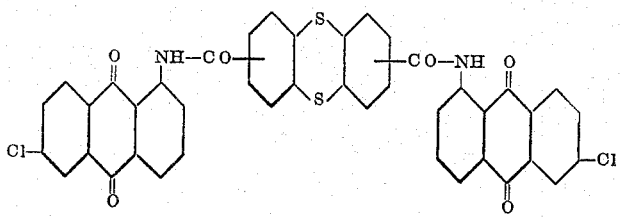

5. A mixture of different vat dyestuffs of the formula

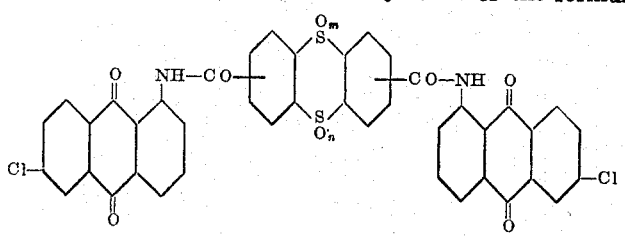

wherein the average value of the sum of $m+n$ is about 1.5.

PAUL SUTTER.
WALTER KERN.

REFERENCES CITED

The following references are of record in the file of this patent:

UNITED STATES PATENTS

| Number | Name | Date |
|---|---|---|
| 2,134,654 | Lulek | Oct. 25, 1938 |
| 2,338,516 | Kern | Jan. 4, 1944 |

FOREIGN PATENTS

| Number | Country | Date |
|---|---|---|
| 238,630 | Switzerland | Nov. 16, 1945 |
| 555,055 | Great Britain | Aug. 3, 1943 |

OTHER REFERENCES

Georgievics and Grandmougin: "A Textbook of Dye Chemistry," pp. 7 and 255; Scott, Greenwood and Son, London, 1920.